United States Patent
Cuenca et al.

(10) Patent No.: US 10,958,150 B2
(45) Date of Patent: Mar. 23, 2021

(54) ELECTRONIC POWER SUPPLY CIRCUIT

(71) Applicants: STMicroelectronics (Rousset) SAS, Rousset (FR); STMicroelectronics S.r.l., Agrate Brianza (IT)

(72) Inventors: Michel Cuenca, Septemes les Vallons (FR); Bruno Gailhard, Rognes (FR); Daniele Mangano, San Gregorio di Catania (IT)

(73) Assignees: STMICROELECTRONICS S.R.L., Agrate Brianza (IT); STMICROELECTRONICS (ROUSSET) SAS, Rousset (FR)

( * ) Notice: Subject to any disclaimer, the term of this patent is extended or adjusted under 35 U.S.C. 154(b) by 0 days.

(21) Appl. No.: 16/414,461

(22) Filed: May 16, 2019

(65) Prior Publication Data

US 2019/0372450 A1 Dec. 5, 2019

(30) Foreign Application Priority Data

May 29, 2018 (FR) ...................................... 1870617

(51) Int. Cl.
*H02M 1/00* (2006.01)
*H02M 1/08* (2006.01)
*H04B 1/40* (2015.01)

(52) U.S. Cl.
CPC ............... *H02M 1/00* (2013.01); *H02M 1/08* (2013.01); *H04B 1/40* (2013.01); *H02M 2001/0045* (2013.01)

(58) Field of Classification Search
CPC .. H02M 1/00; H02M 1/08; H02M 2001/0045; H04B 1/40
See application file for complete search history.

(56) References Cited

U.S. PATENT DOCUMENTS

| | | | |
|---|---|---|---|
| 6,469,478 B1 | 10/2002 | Curtin | |
| 8,154,262 B2 | 4/2012 | Kanayama | |
| 8,258,766 B1 | 9/2012 | Sutardja | |
| 8,988,054 B2 | 3/2015 | Marty | |
| 2008/0122416 A1* | 5/2008 | Cowell | ..................... G05F 1/56 323/280 |
| 2009/0184700 A1* | 7/2009 | Kanayama | ............ H02M 3/158 323/282 |
| 2013/0162233 A1 | 6/2013 | Marty | |
| 2015/0155783 A1 | 6/2015 | Li et al. | |
| 2015/0160668 A1 | 6/2015 | Pujol et al. | |
| 2017/0063229 A1 | 3/2017 | Powell | |
| 2018/0048230 A1 | 2/2018 | Park et al. | |
| 2019/0372450 A1 | 12/2019 | Cuenca et al. | |

FOREIGN PATENT DOCUMENTS

| | | |
|---|---|---|
| CN | 107204705 A | 9/2017 |
| CN | 107707118 A | 2/2018 |
| CN | 210038592 U | 2/2020 |
| GB | 2510394 A | 8/2014 |

* cited by examiner

*Primary Examiner* — Carlos Amaya
(74) *Attorney, Agent, or Firm* — Slater Matsil, LLP

(57) ABSTRACT

An electronic circuit includes a switched-mode power supply and a linear voltage regulation circuit having an input stage, a first output stage, and a second output stage. A first load is capable of being powered either by the switched-mode power supply in series with the regulation circuit or by the regulation circuit without the switched-mode power supply.

23 Claims, 4 Drawing Sheets

ELECTRONIC POWER SUPPLY CIRCUIT

CROSS-REFERENCE TO RELATED APPLICATIONS

This application claims priority to French Patent Application No. 1870617, filed on May 29, 2018, which application is hereby incorporated herein by reference.

TECHNICAL FIELD

The present disclosure concerns electronic circuits and, in particular embodiments, to circuits comprising switched-mode power supplies.

BACKGROUND

Switched-mode power supplies are DC/DC converters that incorporate one or more switching elements. Like other types of power supplies, switched-mode power supplied transfer a power supplied by a source DC to a load, and, doing so, modify the current and/or voltage characteristics.

SUMMARY

An embodiment of the invention provides an electronic circuit comprising a switched-mode power supply, a linear voltage regulation circuit comprising at least one input stage and first and second output stages, and a first load capable of being powered either by the switched-mode power supply in series with the regulation circuit, or by the regulation circuit.

According to an embodiment, the switched-mode power supply is coupled to a first node by an inductance. The first node is coupled to ground by a capacitor and being connected to the first output stage.

According to an embodiment, the first node is coupled to a second node via the first output stage. The second output stage is coupled between a source of application of a power supply voltage and the second node.

According to an embodiment, the regulation circuit comprises a first linear voltage regulator comprising a first input stage and the first output stage and a second linear voltage regulator comprising a second input stage and the second output stage.

According to an embodiment, the regulation circuit comprises a single input stage and two output stages.

According to an embodiment, the or each input stage comprises an operational amplifier and each output stage comprises a transistor.

According to an embodiment, the first and second output stages are each coupled to the second node by a switch.

According to an embodiment, each output stage comprises a switch.

According to an embodiment, the circuit comprises a second load powered by the switched-mode power supply.

According to an embodiment, the second load comprises a radio signal transmit/receive circuit.

Another embodiment provides a method of controlling an electronic circuit comprising a first load capable of being powered either by a switched-mode power supply in series with a linear voltage regulation circuit, or by the linear voltage regulation circuit. The method comprises a first step during which the switched-mode power supply and the regulation circuit are started, the first load being powered by the regulation circuit alone. The method also comprises a second step during which the first load is powered by the switched-mode power supply in series with the regulation circuit.

According to an embodiment, the passing from the first step to the second step occurs after the end of the initialization of the switched-mode power supply.

According to an embodiment, the linear voltage regulation circuit comprises at least one input stage and first and second output stages.

According to an embodiment, during the first step, a first switch, connected between the first load and the first regulator, is off and a second switch, connected between the first load and the second regulator, is on and, during the second step, the first switch is on and the second switch is off.

The foregoing and other features and advantages will be discussed in detail in the following non-limiting description of specific embodiments in connection with the accompanying drawings.

DETAILED DESCRIPTION OF ILLUSTRATIVE EMBODIMENTS

Figure 1:
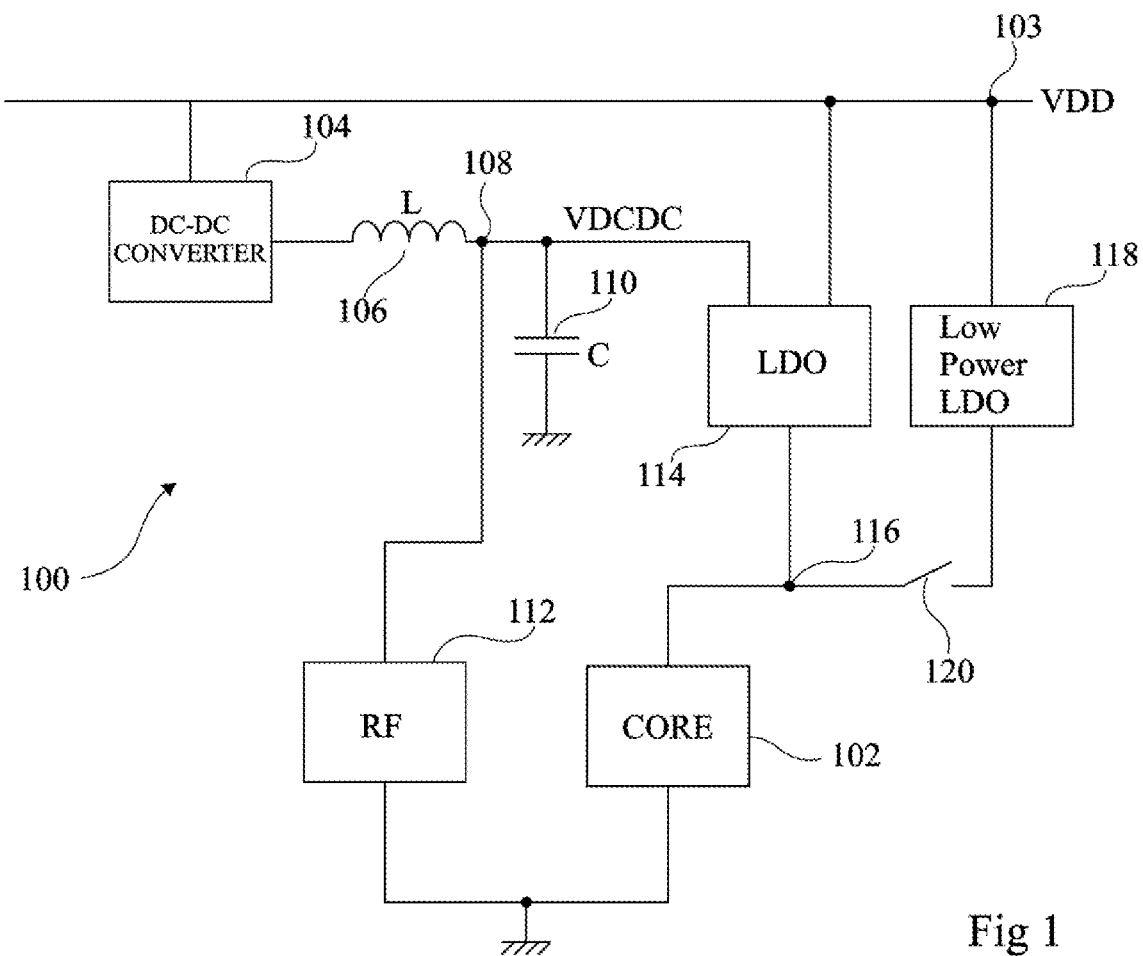
FIG. 1 is a simplified representation of an embodiment of an electronic circuit.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed.

Throughout the present disclosure, the term "connected" is used to designate a direct electrical connection between circuit elements, whereas the term "coupled" is used to designate an electrical connection between circuit elements that may be direct, or may be via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred to the orientation of the drawings.

The terms "approximately," "substantially," and "in the order of" are used herein to designate a tolerance of plus or minus 10%, preferably of plus or minus 5%, of the value in question.

FIG. 1 is a simplified representation of an embodiment of an electronic circuit 100. Circuit 100 comprises a first load, for example, a circuit 102 (CORE). Circuit 102 for example comprises logic elements, for example, a microprocessor and memories.

Circuit 100 further comprises a switched-mode power supply 104 (DC-DC CONVERTER). Switched-mode power supply 104 is connected, at its input, to a node 103 of application of a power supply voltage VDD and, at its output, to a first terminal of an inductance 106 (L). The second terminal of inductance 106 is connected to a node 108. The voltage on node 108 is a voltage VDCDC supplied by switched-mode power supply 104. Node 108 is coupled to ground by a capacitor 110 (C).

Circuit 100 may comprise a second load, for example, a radio (RF) signal transmit/receive circuit 112. Circuit 112 is connected between node 108 and the ground and is powered by switched-mode power supply 104. The RF signal transmit/receive circuit 112 can transmit signals, can receive signals or both transmit and receive signals.

Circuit 100 further comprises a linear voltage regulator 114 (LDO). Regulator 114 is connected, at its input, to node 108 (voltage VDCDC) and to node 103 of application of voltage VDD, and at its output to a node 116. An embodiment of regulator 114 is described in further detail in relation with FIG. 2.

Circuit 102 is connected between node 116 and the ground. Circuit 102 is thus powered by switched-mode power supply 104 in series with regulator 114.

Circuit 100 may comprise another linear voltage regulator 118 (LOW POWER LDO) intended for a low-power operating mode. Regulator 118 is coupled between node 103 of application of voltage VDD and a first terminal of a switch 120. The other terminal of switch 120 is connected to node 116.

In a first operating mode, switched-mode power supply 104 is operating. Switched-mode power supply 104 powers circuit 112 directly and circuit 102 via regulator 114. Further, switch 120 is off. Regulator 118, which may or not, controllably, be operating, thus has no influence on circuit 100.

In a second so-called "low-power" operating mode, switched-mode power supply 104 and regulator 114 are not operating, as well as circuit 112, which is not powered. Switch 120 is on and regulator 118 is operating, which enables to power at least part of the elements of circuit 102.

In a third so-called "Standby" operating mode, circuit 112 is absent or off and circuit 118 is absent or off. Switched-mode power supply 104 and regulator 114 are not operating. Circuit 102 is not powered.

Regulator 118 is configured to supply a relatively low power as compared with the power supplied by regulator 114, for example, sufficient to power part of the elements of circuit 102, typically in stand-by mode. Regulator 118 is for example configured to be able to power volatile memories comprised within circuit 102.

Figure 2:
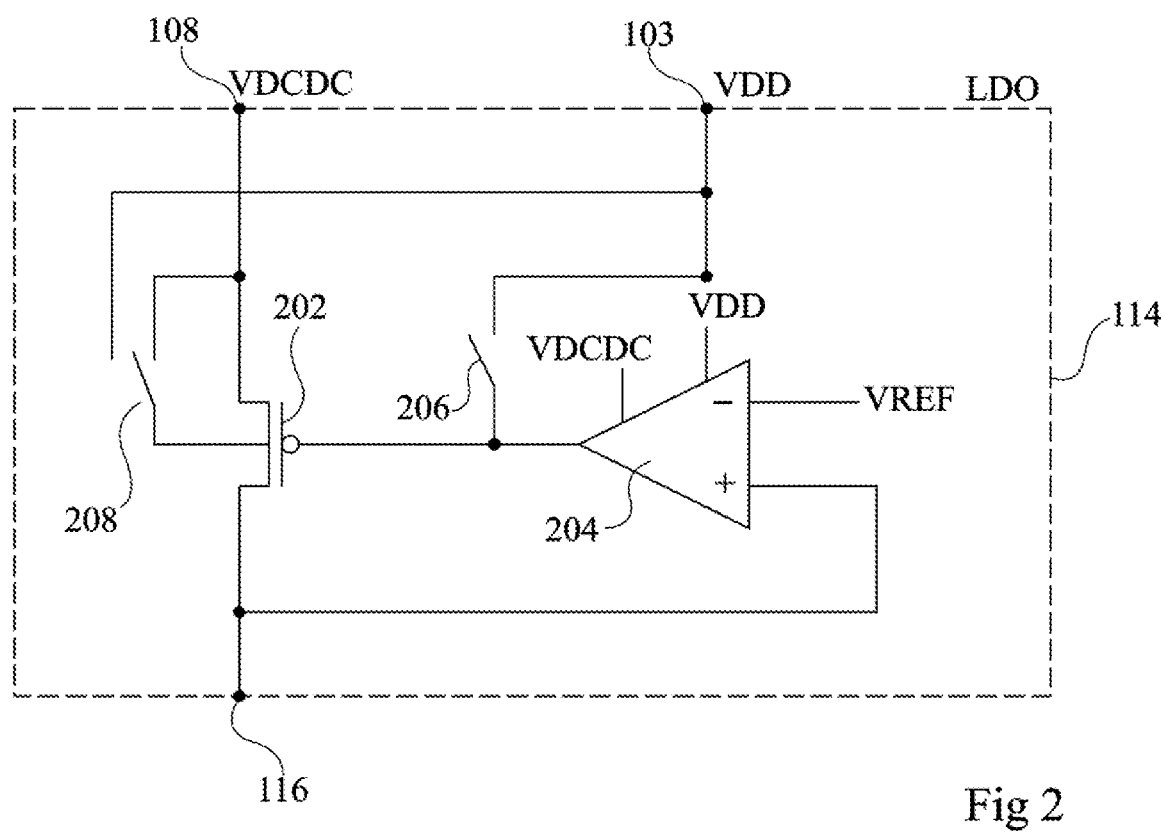
FIG. 2 is a more detailed simplified representation of an element of the circuit of FIG. 1.

FIG. 2 is a more detailed simplified representation of an embodiment of linear regulator 114. Regulator 114 comprises two inputs, connected, as in FIG. 1, to node 103 of application of power supply voltage VDD and to node 108. Regulator 114 further comprises an output connected to node 116.

The regulator comprises an input stage and an output stage. The output stage comprises a transistor 202 connected between terminals 116 and 108. Transistor 202, for example, a PMOS-type transistor, is controlled by the input stage, comprising an operational amplifier 204. Operational amplifier 204 is powered with voltages VDD and VDCDC. The positive (+) and negative (−) inputs of the operational amplifier are respectively connected to node 116 and to a node of application of a reference voltage VREF, lower than VDCDC.

Regulator 114 comprises a switch 206 coupling the gate of the transistor (the output of operational amplifier 204) to node 103 of application of voltage VDD. The gate of transistor 202 may thus controllably be connected or not to node 103 of application of voltage VDD, and voltage VDD may controllably be applied or not to the gate of transistor 202.

Regulator 114 may further comprise a switch 208 coupling the substrate of transistor 202 either to node 103 of application of voltage VDD, or to node 108. Thus, the voltage applied to the substrate of transistor 202 may be either voltage VDCDC, or voltage VDD.

It may be chosen to connect linear voltage regulator 114 in parallel with switched-mode power supply 104, that is, between node 103 of application of voltage VDD and node 108 forming the output of the switched-mode power supply. Circuit 102 would then be connected in parallel with circuit 112 between node 108 and the ground.

However, the noise generated by switched-mode power supply 104 would then risk being transmitted to circuit 112 via a substrate common to circuits 112 and 102. Indeed, circuit 112 is configured to only reject the noise directly reaching it from node 108 and is thus sensitive to noise transmitted by circuit 102.

During the first previously-described operation mode, where circuits 102 and 112 are powered by switched-mode power supply 104 and regulator 114, switch 206 is off and switch 208, if present, couples the substrate of transistor 202 to node 108. Thus, the noise generated by switched-mode power supply 104 is not transmitted to node 116 and is thus not transmitted to the common substrate of circuits 112 and 102.

During the second so-called "low-voltage" operating mode and the third so-called "standby" operating mode, switch 206 is on and switch 208 couples the substrate of the transistor to node 103 of application of voltage VDD. Thus, voltage VDD is applied to the substrate and to the gate of transistor 202. This enables to avoid current leakages between node 108 and node 116. This thus enables to avoid discharging capacitor no during this operating mode. Indeed, transistor 202 is off and the gate/source and gate/drain voltages of transistor 202 are negative, and thus leakages between the drain and the source are negligible.

Figure 3:
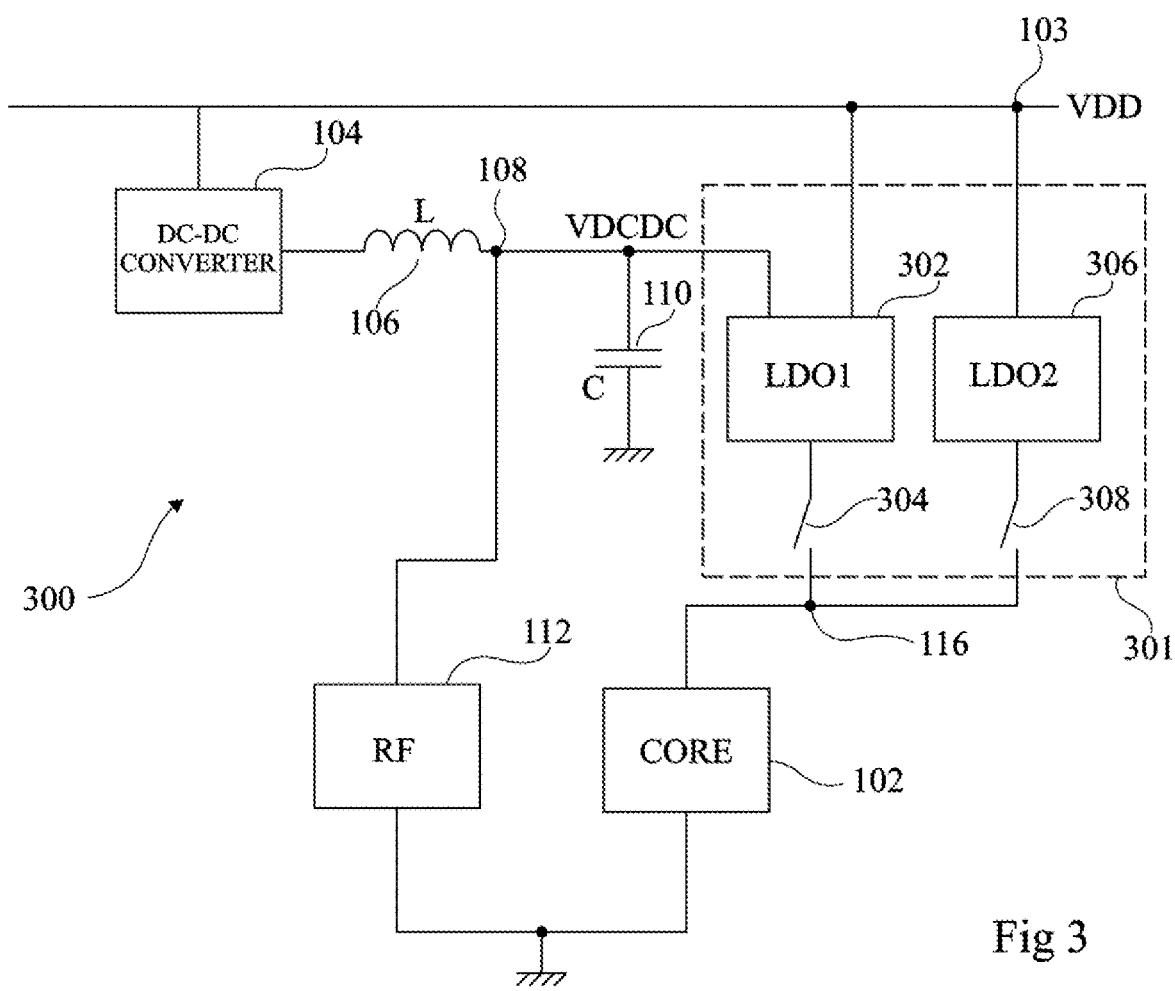
FIG. 3 is a simplified representation of another embodiment of an electronic circuit.

FIG. 3 is a simplified representation of another embodiment of an electronic circuit 300.

Circuit 30o comprises elements previously described in relation with FIG. 1 and similarly connected. In particular, circuit 300 comprises switched-mode power supply 104, inductance 106, capacitor 110, radio signal transmit and/or receive circuit 112, and circuit 102. Circuit 300 further comprises a linear voltage regulation circuit 300. In the example of FIG. 3, the regulation circuit comprises a regulator 302 (LD01), replacing regulator 114, and which may for example comprise the same components as regulator 114 (in particular transistor 202 and switches 206 and 208) or may be another type of linear voltage regulator. The regulation circuit further comprises another linear voltage regulator 306 (LDO2). Regulator 306 is for example similar to regulator 114. Each regulator 302 or 306 comprises an input stage, comprising an operational amplifier, and an output stage comprising a transistor.

In this embodiment, regulator 302 is coupled to node 116 (forming the input of circuit 102) by a switch 304. Further, linear voltage regulator 306 is coupled between node 103 of application of voltage VDD and a first terminal of a switch 308, the other terminal of the switch being connected to node 116. Regulator 306 may then be coupled between node 103 and node 116 via the transistor of its output stage. Regulator 306 is capable of powering circuit 102. Regulator 306 is for example similar to regulator 302 and capable of supplying a power greater than the power supplied by regulator 118 of FIG. 1. More particularly, regulator 306 is for example capable of supplying a power sufficient to generally operate circuit 102.

As a variation, it is possible for switches 304 and 308 not to be present. The transistors of the output stages of regulators 302 and 306 are then used as switches.

The initialization of switched-mode power supply 104, that is, the period between the time at which switched-mode power supply 104 is turned on and the time at which switched-mode power supply 104 is capable of powering circuits 112 and 102, is longer than the initialization of a linear regulator such as regulator 306, for example, at least from 30 to 1,000 times longer.

Figure 4:
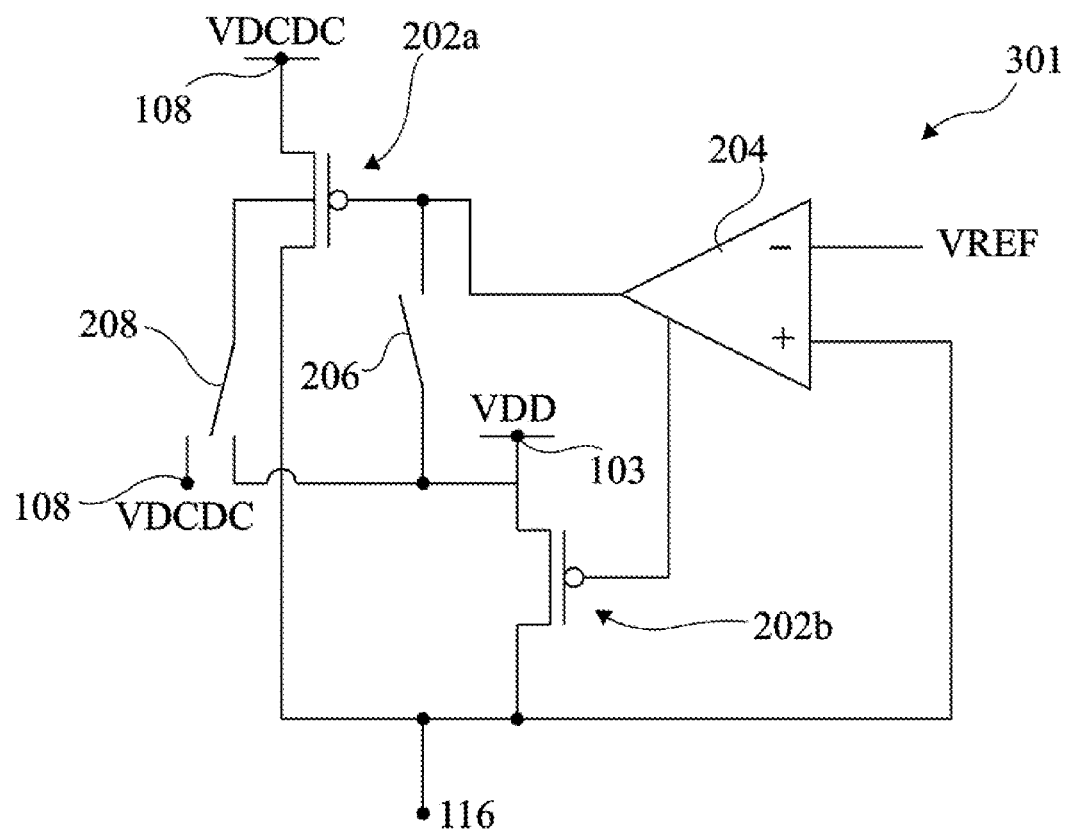
FIG. 4 is a simplified representation of a portion of another embodiment of an electronic circuit.

FIG. 4 is a simplified representation of a portion of another embodiment of an electronic circuit. More particularly, FIG. 4 shows an embodiment of regulation circuit 301.

In the example of FIG. 4, the regulation circuit comprises a single input stage and two output stages. A first output stage comprises a transistor 202a, connected between node 108 and node 116, and a second output stage comprises a transistor 202b, connected between node 103 and node 116. Transistors 202a and 202b are similar to transistor 202 of FIG. 2. Transistors 202a and 202b respectively play the role of switches 304 and 308. Like transistor 202 of FIG. 2, the gate of transistor 202a may for example be controllably connected or not to node 103 of application of voltage VDD via switch 206. The substrate of transistor 202a may for example be connected, via switch 208, to node 103 (VDD) or to node 108 (VDCDC).

Transistor 202a and transistor 202b are controlled by a same circuit, here operational amplifier 204 of the input stage. Operational amplifier 204 comprises two outputs, one connected to the gate of transistor 202a and the other connected to the gate of transistor 202b. The positive input (+) of the operational amplifier is connected to node 116 and its negative input (−) receives reference voltage VREF. The circuit described in relation with FIG. 4 has an operation similar to that of the circuit described in relation with FIG. 3.

An embodiment of a method of controlling electronic circuit 300 comprises a first step during which switch 304 or transistor 202a is off and switch 308, or transistor 202b, is on. Thus, circuit 102, for example comprising at least one microprocessor, is powered by the second output stage of the regulation circuit and is able to operate. During this step, switched-mode power supply 104 and the first output stage of the regulator are on and the initialization of the switched-mode power supply takes place.

During a second step, switch 304 or transistor 202a is on and switch 308, or transistor 202b, is off. Thus, circuit 102 is powered by switched-mode power supply 104 and the first output stage of the regulation circuit. The second output stage of the regulation circuit can then be turned off.

The second step for example occurs after the end of the initialization of switched-mode power supply 104, which can then power circuits 102 and 112.

During a third step (Bypass mode), the second output stage of the regulation circuit is turned back on and the first output stage of the regulation circuit is turned off. Capacitor 110 remains charged. Thus, on turning back on of regulator 302 after the end of the bypass mode, the efficiency is instantaneously optimal.

An advantage of the embodiments described in relation with FIG. 3 is that it is not necessary to wait for the end of the initialization of switched-mode power supply 104 for circuit 102 to be operating.

Various embodiments and variations have been described. These various embodiments and variations may be combined and other variations will occur to those skilled in the art.

Finally, the practical implementation of the described embodiments and variations is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An electronic circuit comprising:
 a switched-mode power supply having an input coupled to a first supply terminal, and an output coupled to a first node;
 a linear voltage regulation circuit comprising an input stage, a first output stage comprising a first transistor having a current path coupled between the first node and a second node, and a second output stage comprising a second transistor coupled between the first supply terminal and the second node;
 a first switch coupled between a control terminal of the first transistor and the first supply terminal;
 a second switch having a first terminal coupled to a substrate of the first transistor, and a second terminal switchable between the first supply terminal and the first node; and
 a first load coupled to the second node and capable of being powered either by the switched-mode power supply in series with the regulation circuit or by the regulation circuit without the switched-mode power supply.

2. The circuit of claim 1, wherein the switched-mode power supply is coupled to the first node by an inductance, the first node being coupled to ground via a capacitor.

3. The circuit of claim 1, wherein the first output stage is coupled to the second node by a third switch and the second output stage is coupled to the second node by a fourth switch.

4. The circuit of claim 1, wherein the regulation circuit comprises:
 a first linear voltage regulator comprising the input stage and the first output stage; and
 a second linear voltage regulator comprising a second input stage and the second output stage.

5. The circuit of claim 1, wherein the regulation circuit comprises a single input stage and two output stages.

6. The circuit of claim 1, wherein the input stage comprises an operational amplifier having an output coupled to the control terminal of the first transistor.

7. The circuit of claim 1, further comprising a second load configured to be powered by the switched-mode power supply.

8. The circuit of claim 7, wherein the second load comprises a radio signal transmit/receive circuit.

9. A method of controlling an electronic circuit that comprises a switched-mode power supply and a linear voltage regulation circuit, the method comprising:
 performing a first step by starting the switched-mode power supply and the regulation circuit and powering a first load by the regulation circuit alone, wherein the switched-mode power supply has an input coupled to a first supply terminal, and an output coupled to a first node, and wherein the regulation circuit comprises a first transistor having a current path coupled between the first node and the first load, a second transistor coupled between the first supply terminal and the first load, a first switch coupled between a control terminal of the first transistor and the first supply terminal, and a second switch having a first terminal coupled to a substrate of the first transistor, and a second terminal switchable between the first supply terminal and the first node; and performing a second step after the first step by powering the first load using the switched-mode power supply in series with the regulation circuit.

10. The method of claim 9, wherein a transition from the first step to the second step occurs after an initialization of the switched-mode power supply.

11. The method of claim 9, wherein the linear voltage regulation circuit comprises an input stage comprising an operational amplifier coupled to the first transistor, a first output stage comprising the first transistor, and a second output stage comprising the second transistor.

12. The method of claim 9, wherein, during the first step, the first transistor is off and the second transistor on, and wherein, during the second step, the first transistor is on and the second transistor is off.

13. An electronic circuit comprising:
a switched-mode power supply having an input coupled to a first supply terminal, and an output coupled to a first node; and
a linear voltage regulation circuit comprising a first transistor having a current path coupled between the first node and a second node, a second transistor coupled between the first supply terminal and the second node, a first switch coupled between a control terminal of the first transistor and the first supply terminal, and a second switch having a first terminal coupled to a substrate of the first transistor, and a second terminal switchable between the first supply terminal and the first node;
wherein the electronic circuit is configured to perform a first step by starting the switched-mode power supply and the linear voltage regulation circuit and powering a first load by the regulation circuit alone by using the second transistor and to then perform a second step by powering the first load using the switched-mode power supply in series with the regulation circuit by using the first transistor.

14. The circuit of claim 13, wherein the linear voltage regulation circuit comprises an input stage, a first output stage comprising the first transistor, and a second output stage comprising the second transistor.

15. The circuit of claim 13, wherein the switched-mode power supply is coupled to the first node by an inductance, the first node being coupled to ground via a capacitor.

16. The circuit of claim 14, wherein the first output stage is coupled to the second node by a first third switch and the second output stage is coupled to the second node by a second fourth switch.

17. The circuit of claim 14, wherein the regulation circuit comprises:
a first linear voltage regulator comprising the input stage and the first output stage; and
a second linear voltage regulator comprising a second input stage and the second output stage.

18. The circuit of claim 14, wherein the input stage comprises an operational amplifier.

19. An electronic circuit comprising:
a DC-DC power converter;
a transistor having a current path coupled between an output of the DC-DC power converter and a load terminal;
an operational amplifier having an output coupled to a control terminal of the transistor;
a first switch coupled between the output of the operational amplifier and a supply node; and
a second switch with a first terminal coupled to the output of the operational amplifier and a second terminal switchable between the supply node and the output of the DC-DC power converter.

20. The circuit of claim 19, further comprising a second transistor having a current path between the supply node and the load terminal.

21. The circuit of claim 19, further comprising:
an inductor having a first terminal coupled to the output of the DC-DC power converter and a second terminal coupled to the transistor; and
a capacitor having a first plate coupled to a second terminal of the inductor and a second plate coupled to a reference node.

22. The circuit of claim 13, wherein the first and second transistors and p-type transistors.

23. The circuit of claim 14, wherein the switched-mode power supply is coupled to the first node by an inductance, the first node being coupled to ground via a capacitor, and wherein the electronic circuit is configured to perform a third step comprising turning on the second output stage and turning off the first output stage so that the capacitor remains charged.

* * * * *

UNITED STATES PATENT AND TRADEMARK OFFICE
CERTIFICATE OF CORRECTION

PATENT NO. : 10,958,150 B2
APPLICATION NO. : 16/414461
DATED : March 23, 2021
INVENTOR(S) : Michel Cuenca Page 1 of 1

It is certified that error appears in the above-identified patent and that said Letters Patent is hereby corrected as shown below:

In the Claims

In Column 8, Line 7, Claim 16, delete "by a first third switch" and insert --by a third switch--.

In Column 8, Lines 8-9, Claim 16, delete "by a second fourth switch" and insert --by a fourth switch--.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*